US006244872B1

(12) United States Patent
Hirayama

(10) Patent No.: US 6,244,872 B1
(45) Date of Patent: Jun. 12, 2001

(54) OPTICAL DOT IMAGE DISPLAY

(76) Inventor: Shozo Hirayama, 603, Kamimeguromanshon, 21-20, Higashiyama 1-chome, Meguro-ku, Tokyo (JP)

( * ) Notice: Subject to any disclaimer, the term of this patent is extended or adjusted under 35 U.S.C. 154(b) by 0 days.

(21) Appl. No.: 09/230,703

(22) PCT Filed: May 28, 1998

(86) PCT No.: PCT/JP98/02365

§ 371 Date: Jan. 29, 1999

§ 102(e) Date: Jan. 29, 1999

(87) PCT Pub. No.: WO98/54689

PCT Pub. Date: Dec. 3, 1998

(30) Foreign Application Priority Data

May 29, 1997 (JP) ... 9-154346

(51) Int. Cl.[7] ... G09B 11/00

(52) U.S. Cl. ... 434/81; 434/428; 446/485

(58) Field of Search ... 434/81, 84, 90, 434/365, 428, 430; 40/449, 452, 442, 441, 443, 444; 362/252, 317, 319, 321, 322; 446/91, 118, 451, 485

(56) References Cited

U.S. PATENT DOCUMENTS

| | | | | |
|---|---|---|---|---|
| 4,139,841 | * | 2/1979 | Roberts | 340/373 |
| 4,541,812 | * | 9/1985 | Katsumata | 446/91 |
| 5,055,832 | * | 10/1991 | Browne | 340/764 |
| 5,204,651 | * | 4/1993 | Fiorentini | 335/219 |
| 5,266,935 | * | 11/1993 | Wahlert | 345/84 |
| 5,337,077 | * | 8/1994 | Browne | 345/109 |
| 5,351,065 | * | 9/1994 | Killinger | 345/109 |
| 5,406,302 | * | 4/1995 | Killinger | 345/55 |
| 5,555,163 | * | 9/1996 | Pisani | 362/252 |
| 5,642,130 | * | 6/1997 | Browne | 345/111 |
| 5,771,616 | * | 6/1998 | Tijanic | 40/452 |
| 5,784,190 | * | 7/1998 | Worley | 359/291 |
| 5,793,349 | * | 8/1998 | Browne | 345/109 |
| 5,898,418 | * | 4/1999 | Kao | 345/108 |

FOREIGN PATENT DOCUMENTS

| | | |
|---|---|---|
| 47-25195 | 7/1972 | (JP) . |
| 1-23180 | 7/1989 | (JP) . |
| 3-102600 | 4/1991 | (JP) . |

* cited by examiner

*Primary Examiner*—Jacob K. Ackun
*Assistant Examiner*—Kit Fernstrom
(74) *Attorney, Agent, or Firm*—Christie, Parker & Hale, LLP

(57) ABSTRACT

A light-drawing type display apparatus according to the present invention is formed by: a plate provided in the front side of the apparatus and having a plurality of light-transmitting small holes and standing upright; each light-cutting member is provided to each of the small holes of the plate in order to open or close each of the small holes; and a light source provided to the rear of the light-cutting members for irradiating the whole of the plate; wherein the light-cutting members are moved by using a predetermined writing means so that the light-transmitting small holes are opened, and the light from the light source is transmitted to the front side, then, characters or pictures are drawn on the plate; and wherein the light-cutting members are moved by using a predetermined erasing means so that the light-transmitting small holes are closed, and the light from the light source is cut off, then, characters or pictures are erased from the plate. The plate-like magnet, the spherical magnetic member, or the spherical light-cutting member is used as the light-cutting member; the magnet bar, the writing brush, or the blowing tool, is used as the writing means; and the magnet, or the sucking tool for air is used as the erasing tool.

2 Claims, 8 Drawing Sheets

OPTICAL DOT IMAGE DISPLAY

TECHNICAL FIELD

The present invention relates to a light-drawing type display apparatus. Particularly, it relates to a light-drawing type display apparatus which provides a plurality of light-transmitting small holes in a board each having a predetermined size; provides a light source to the back side of the board; mounts, for example, a sphere-like light-cutting member to each of the small holes; moves the light-cutting member by using a predetermined writing means or an erasing means so that the light from the light source can be transmitted or cut off: and draws predetermined characters or pictures on the board or erases them from the board. The board of the light-drawing type display apparatus according to the present invention can be applied to, for example, a board used in a council room, a black board used in a school room, a board used for an advertisement, and building materials, for example, windows, for admitting light from outside a house.

BACKGROUND ART

As conventional display apparatuses, there are known a blackboard using a chalk and a white board using a colored quick-drying ink, etc., in order to draw characters or pictures on the board.

When using chalk, there are problems, however, in sanitation. That is, one problem is the dust occurring when erasing the board in use or after use of the chalk, and the other is the uncomfortable sound occurring when the chalk scrapes the board. Further, there is uncomfortable touch for a tip of a finger when holding the chalk. On the other hand, when using quick-drying ink, there is a problem that the quick-drying ink cannot be easily erased after use, as well as the above problems of the chalk.

Further, another problem is that it is very hard to see the surface of the board due to reflection of the light from the board depending on the angle in observation of the black board or the white board.

Still further, there is a drawing toy which is formed by mixing iron sand into milk white fluid, enclosing the fluid into a small resin capsule, and arranging a plurality of resin capsules so as to constitute the board. In this structure, when drawing characters or pictures on the board, the iron sand is brought up to the surface of the board by using a magnetic bar. When erasing them, the iron sand is removed from the surface of the board by using another magnetic bar.

There is a problem, however, in this drawing toy. That is, it is very hard to partially erase characters or pictures from the board although it is possible to easily draw them on the board. As a result, this is inconvenient in actual use since the whole of the surface of the board is erased at once. Further, there is a problem that it is hard to observe the surface of the board depending on the observation angle since the light is reflected from the surface of the capsules.

Still further, recently, there is a display apparatus which arranges a plurality of photodiodes or liquid crystal elements on a flat board and controls the voltage supplied to them. Various types of this display apparatus have been developed and applied to various products. However, there are problems in this type of display apparatus. That is, although it is possible to realize high quality image in this type of the display apparatus, this display apparatus is very expensive, and the contents to be displayed must be previously input through a predetermined input device. As a result, this type of the display apparatus has no flexibility and convenience in actual use.

SUMMARY OF THE INVENTION

The object of the present invention is to provide a new light-drawing type display apparatus which can solve the above-mentioned problems which occur in actual use of the black board, the white board, etc. The light-drawing type display apparatus according to the present invention has various advantages such as, for example, being very convenient in actual use, having a simplified structure and being low in cost, etc. That is, according to the present invention, it is possible to clearly solve the conventional problems which are caused by dust and the uncomfortable sound or touch in actual use of the chalk, and which are caused by the smell of the quick-drying ink. Further, according to the present invention, it is possible to easily erase, after use, and to avoid light reflection from the board depending on the observation angle.

According to the light-drawing type display apparatus of the present invention, there are provided a plate in the front side of the apparatus (i.e., the side in which a user observes the board) having a plurality of light-transmitting small holes (e.g., a plurality of penetrated small holes) and standing upright; a plurality of light-cutting members each of which is provided to each of small holes on the plate in order to open or close each of small holes; and a light source provided to the rear side of the plurality of light-cutting members for irradiating the whole of the plate;

wherein the plurality of light-cutting members are moved by using a predetermined writing means so that the plurality of light-transmitting small holes are opened, and the light from the light source is transmitted to the front side, then, characters or pictures are drawn on the plate; and wherein the plurality of light-cutting members are moved by using a predetermined erasing means so that the plurality of light-transmitting small holes are closed, and the light from the light source is cut off, then, characters or pictures are erased from the plate.

In an embodiment, a plurality of plate-like light-cutting members are provided to the rear side of the plate, each of the plate-like light-cutting members has a sufficient size for closing each small hole and is mounted to the rear side of each small hole so as to be freely rotated by using a supporting shaft, and a magnet is mounted to each plate-like light-cutting member; a magnetic member is mounted to an upper portion of each small hole in the rear side of the plate so as to make an attraction force provided between the magnetic member and the magnet mounted to each plate-like light-cutting member;

the magnet is used as a predetermined writing means, the direction of the magnetic force of the magnet is directed to the direction for making a reaction force provided to the magnetic member, and each of the plurality of plate-like light-cutting members is moved to a position where the light from the light source is transmitted, by bringing the magnet near to the plate; and the magnet is used as a predetermined erasing means, the direction of the magnetic force of the magnet is directed to the direction for making the attraction force provided to the magnetic member, and each of the plurality of plate-like light-cutting members is moved to a position where the light from the light source is cut off, by bringing the magnet near to the plate.

In another embodiment, each of the light-cutting members is formed of a spherical magnetic light-cutting member;

a light-transmitting holder which is inclined to a predetermined angle is mounted to each small hole through the magnet provided to the rear side of the plate; and the spherical magnetic light-cutting member is arranged so as to move within the holder; wherein when an external force from a writing brush used as the writing means and gravity act on the spherical magnetic light-cutting member, the spherical magnetic light-cutting member is moved within the holder so as to transmit the light from the light source; and wherein when the magnet used as the erasing means is brought near to the magnetic light-cutting member, the spherical magnetic light-cutting member is moved to the rear of the plate so that the light from the light source is cut off.

In still another embodiment, each of the light-cutting members is formed of a spherical magnetic light-cutting member which can move within a light-transmitting holder which is inclined to a predetermined angle and mounted to each small hole in the rear side of the plate;

wherein when blowing force from a blowing tool used as the writing means and gravity act on the spherical magnetic light-cutting member, the spherical magnetic light-cutting member is moved within the holder so as to transmit the light from the light source; and wherein when a sucking tool used as the erasing means is brought near to the magnetic light-cutting member, and the spherical magnetic light-cutting member is moved to the rear of the plate so that the light-cutting member is put on a dent portion of each hole of the plate or the holder adjacent to the plate the light from the light source is cut off.

DETAILED DESCRIPTION OF THE INVENTION

Figure 1:
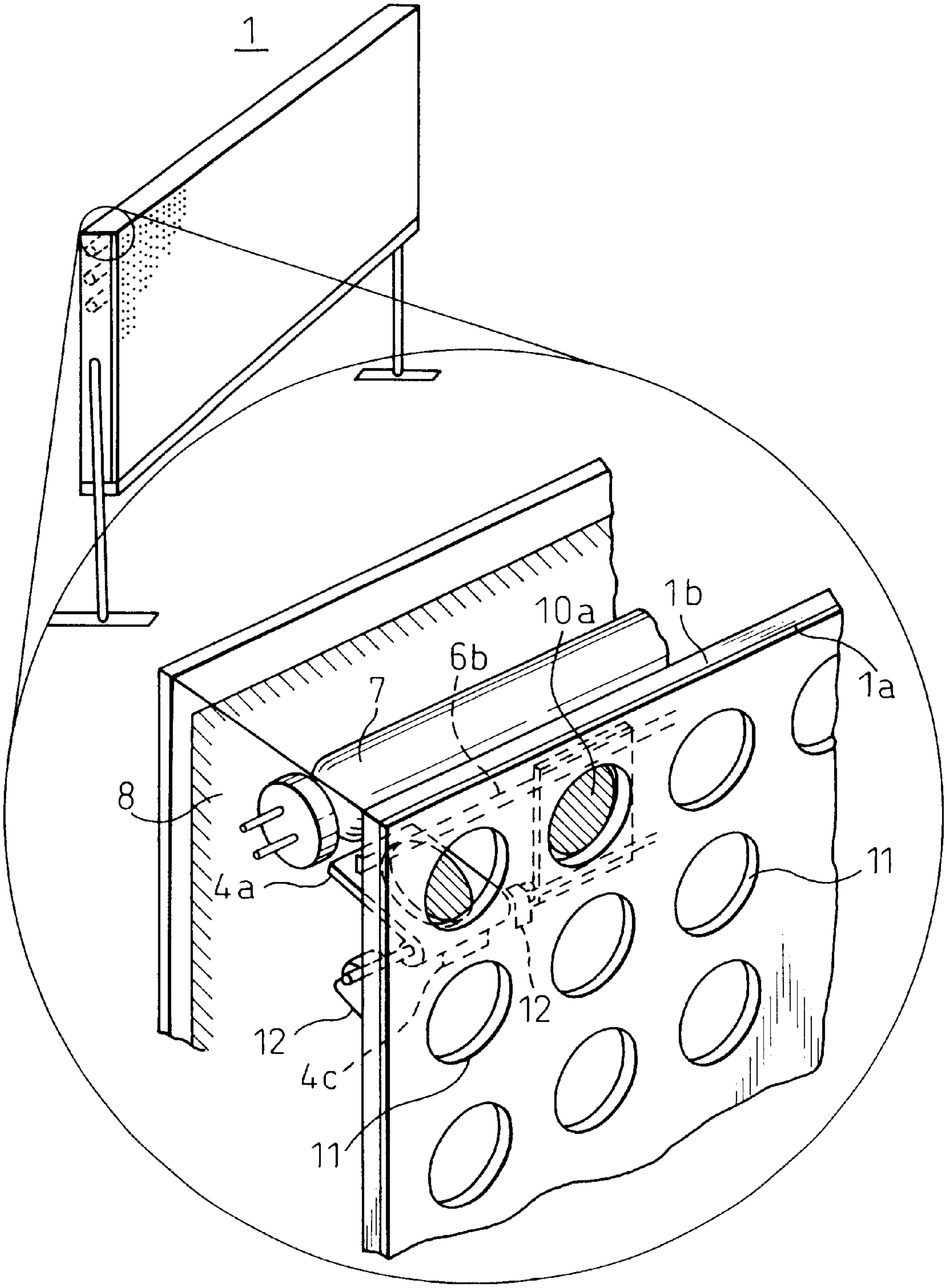
FIG. 1 a perspective view for explaining a mounted structure of light-cutting members in a light-drawing type display apparatus according to the first embodiment of the present invention.

The light-drawing type display apparatus according to the present invention is explained in detail with reference to drawings below.

In FIGS. 1 to 9 explained below, reference numeral 1 denotes the light-drawing type display apparatus according to the present invention. 1*a* is a transparent member, for example, a transparent plate or transparent sheet. 1*b*, 1*c* and 1*d* are plate members. 4*a* is a light-cutting member. 4*b* is a bearing portion. 4*c* is a stopper portion. 5*a* is a holder. 5*b* is a hole. 6 is a magnet. 7 is a light source. 8 is a reflection board. 9 is a finger. 10 and 10*a* are magnets. 11 and 11*a* are holes. 12 is a bearing portion. 14 is a brush. 15 is a dent portion. 16 is a blowing tool. 17 is a sucking tool. 18 is a finger-stall type brush. 18*a* is a brush. 18*b* is an air hole. 20 is a frame. N denotes N-pole of the magnet. S denotes S-pole of the magnet.

First, the light-drawing type display apparatus according to the first embodiment of the present invention is explained in detail with reference to FIGS. 1 to 3.

Figure 2:
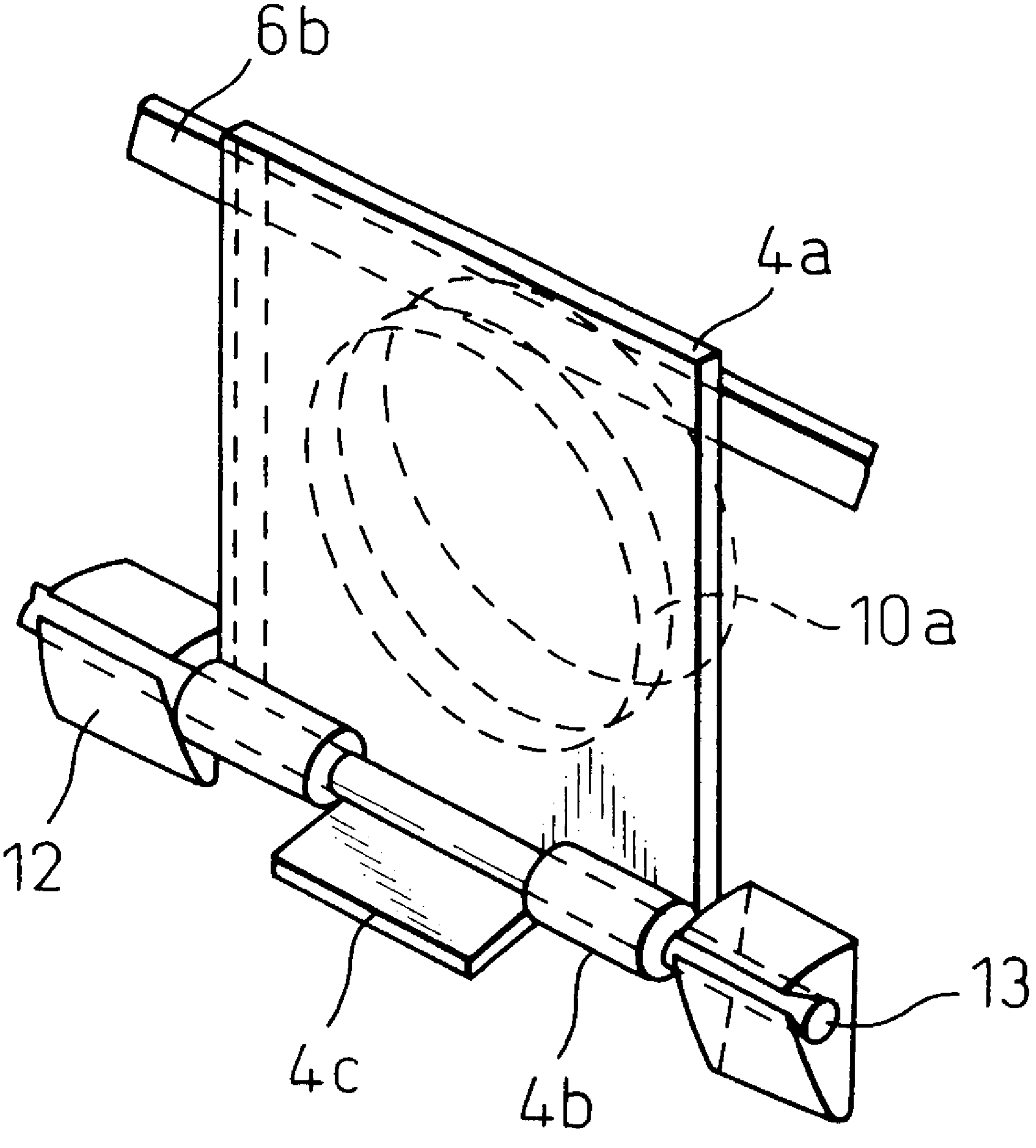
FIG. 2 is a perspective view of a rear portion of the light-cutting member in FIG. 1.

FIG. 1 is a perspective view of the mounted structure of light-cutting members in the light-drawing type display apparatus according to the first embodiment of the present invention, FIG. 2 is a rear and perspective view of a part of the structure shown in FIG. 1 in order to show in detail the mounted state of each light-cutting member 4A to the rear surface.

In FIGS. 1 and 2, in the light-drawing type display apparatus 1 according to the present invention, the plate has a plurality of holes and stands upright. An enlarged left upper corner is shown within a circle of the drawing. As shown in the drawing, the plate 1*b* having a plurality of small holes is provided in front of the board. Further, the transparent sheet 1*a* which can transmit the light and can cut off airflow, is provided in front of the plate 1*a* in order to prevent dust entering. In this embodiment, although the transparent sheet 1*a* is bonded to the plate, it is possible to provide a plurality of small holes each having light transparency by performing a predetermined surface process on the plate 1*b* itself without use of the transparent sheet. Further, the light source 7 which is formed by a plurality of fluorescent lamps, is provided in the rear side of the plate 1*b* (in the drawing, only one fluorescent lamp is shown in order to simplify the structure). Further, the reflection plate 8 is provided in the rear side of the light source 7 so that it is possible to realize increased light amount and uniform brightness on the surface of the board.

In the front of the plate 1*b*, a plurality of small holes 11 are provided as shown in the drawing. As shown in detail in FIG. 2, a magnetic member 6*b* is mounted to the upper portion of each small hole in the rear of the plate 1*b*. The bearing 12 which supports the shaft 13 so as to be freely rotated, is mounted to the lower portion of each small hole 11. Further, a magnet 10*a* is mounted to the light-cutting member 4*a* in correspondence with each small hole 11, and the light-cutting member 4*a* is mounted to the shaft 13 so as to be freely rotated by the bearing 4*b*. The stopper 4*c* is mounted to the lower portion of the light-cutting member 4*a* in order to limit a rotational angle when the light-cutting member 4*a* is rotated.

Figure 3A:
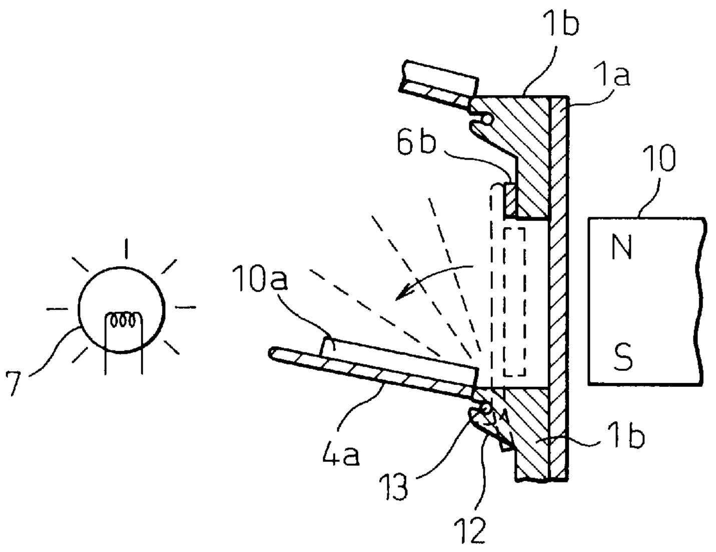
FIGS. 3(A) and 3(B) are explanatory views for explaining the operation of a moving mechanism of the light-cutting member in the light-drawing type display apparatus according to the first embodiment of the present invention.
Figure 3B:
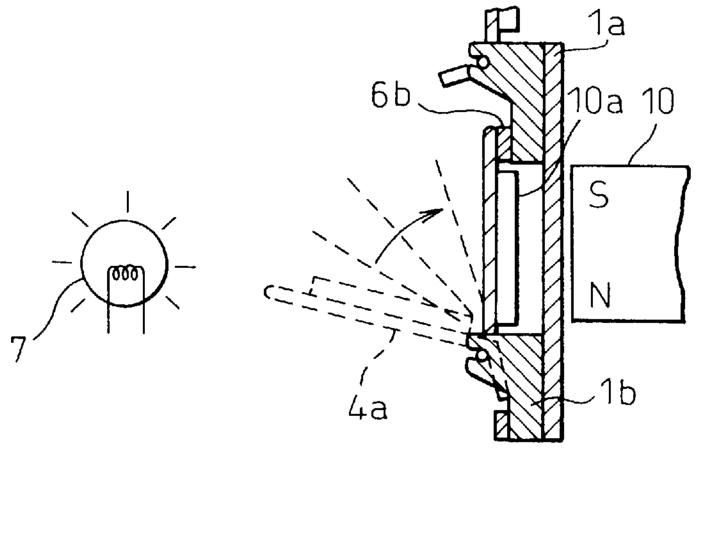

FIGS. 3(A) and 3(B) are explanatory views for explaining operation of the moving mechanism of the light-cutting member in the light-drawing type display apparatus according to the first embodiment of the present invention. As mentioned above, reference number 1*a* is a transparent sheet which is provided in order to transmit only the light and to prevent dust entering each small hole.

When this display apparatus is not used after the board was erased by the erasing means mentioned below, as shown by FIG. 3(B), the light-cutting member 4*a* is provided to the rear of each small hole which is provided to the plate 1*b* in the front side of the light-drawing type display apparatus, and closes the small hole based on an attraction force provided between the magnet 6*b* mounted to the rear of the plate 1*b* and the magnet 10*a* mounted to the light-cutting member 4*a* itself. As a result, it is possible to cut the light from the light source 7.

In actual use of the light-drawing type display apparatus according to the present invention, as shown in FIG. 3(A), the magnet 10 used as the writing means, in which the direction of the magnetic force lines thereof is directed to the direction of the reaction force to the magnet 10*a,* is moved to the vicinity of each hole. The magnet 10*a* rotates to the direction shown by an arrow line with the light-cutting member due to the reaction force and against the attraction force, so that it is possible to open the small hole and to transmit the light. In this case, since the stopper 4*c* (see FIG. 2) is provided to the lower portion of the light-cutting member 4*a,* it is possible to suitably move the light-cutting member 4*a* in accordance with an amount of light.

As shown in FIG. 3(B), as the erasing means, when the direction of the magnet 10 is reversed so that the N-pole is turned to the S-pole, and when the magnet 10 is moved to the vicinity of each small hole, the light-cutting member 4*a* is rotated to the direction shown by the arrow line based on the attraction force so that the small hole is closed by the light-cutting member 4*a* and the light from the light source 7 is cut off. Even if the magnet 10 is removed from the small hole after the above operation, it is possible to maintain stably light-cutting state based on the attraction force between the magnet 10*a* mounted to the light-cutting member 4*a* and the magnetic member 6*b* mounted to the rear of the plate 1*b*.

Further, as a material of the plate 1*b* in the present invention, any material can be used if it is a non-magnetic material, and it is possible to also use a resin. Further, as the material of the light-cutting member 4*a,* although it is possible to use any magnetic material if it can cut off the light, preferably an iron plate is used because of the easy manufacturing process. Further, as the material of the magnet 10*a,* it is preferable to use an anisotropic resin-bonding magnet although it is necessary to weaken the magnetic force to less than that of the magnet 10.

Figure 4A:
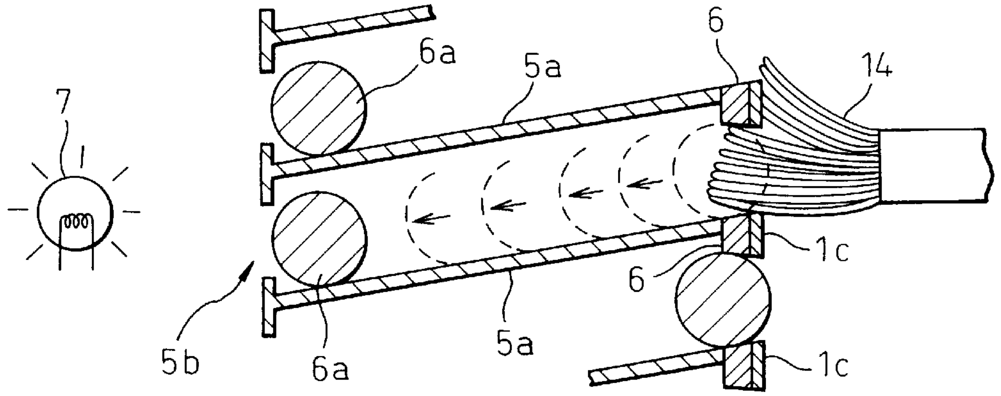
FIGS. 4(A) and 4(B) are explanatory views for explaining the operation of the moving mechanism of the light-cutting member in the light-drawing type display apparatus according to the second embodiment of the present invention.
Figure 4B:
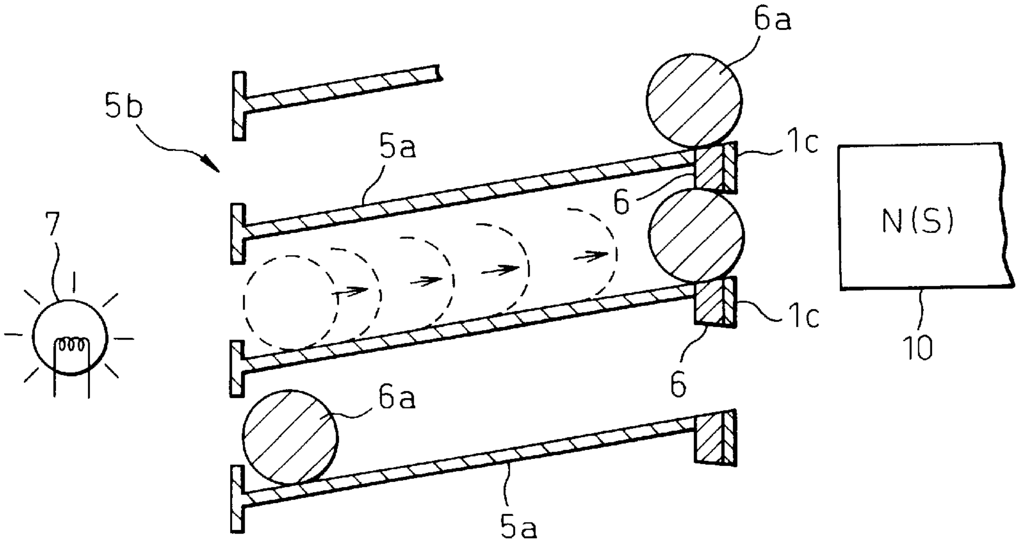
Figure 5:
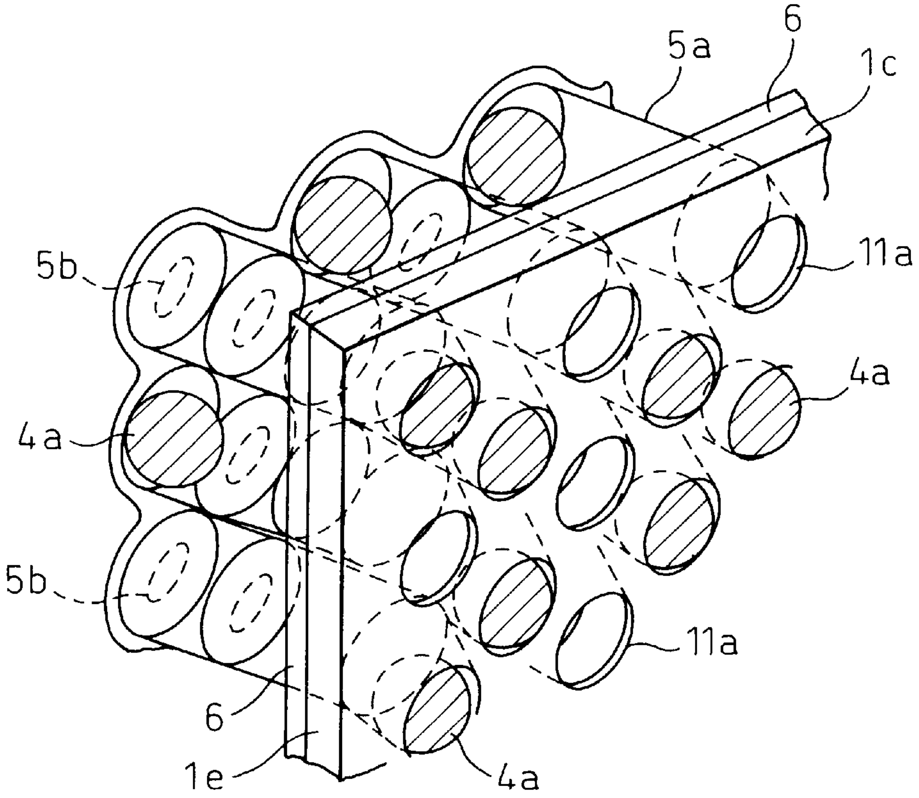
FIG. 5 is a partially enlarged perspective view of the second embodiment shown in FIGS. 4(A) and 4(B).

FIGS. 4(A) and 4(B) show the light-drawing type display apparatus according to the second embodiment of the present invention, and FIG. 5 is a partially enlarged perspective view of the second embodiment shown in FIGS. 4(A) and 4(B).

In the second embodiment, the magnet 6 is mounted to the rear of the plate 1, and a plurality of holes are provided so as to penetrate the plate 1*c* and the magnet 6. Further, there are a plurality of light-transmitting holders 5*a* each provided to the corresponding small hole and each formed of a tube in which a magnetic light-cutting member 6*a* can be freely moved therein. The magnet 6 is mounted to the light-transmitting holder 5*a*. In this case, each tube which constitutes the light-transmitting holder 5*a* is inclined in order to move the magnetic light-cutting member 6*a* to the hole 5*b* in response to the gravity.

When drawing characters or pictures on the light-drawing type display apparatus according to the second embodiment, first, before use of the apparatus, the plate 1*c* is inclined to the front side, and all magnetic light-cutting members 6*a* are moved to the plate 1*c* side by gravity in order to obtain the light-cutting state. When the magnetic light-cutting member 6*a* is contacted to the magnet 6 which is mounted to the rear of the plate 1*c,* the magnetic light-cutting members 6*a* are collected to the front side in accordance with the attraction force between the magnetic light-cutting member 6*a* and the magnet 6 and against gravity so that it is possible to always maintain the light-cutting state.

Next, as shown in FIG. 4(A), the magnetic light-cutting member 6*a* is directly pushed using the brush 14 as the writing means. The pushed magnetic light-cutting members 6*a* are removed from the plate 1*c* against the attraction force between the magnetic light-cutting member 6*a* and the magnet 6. After removal of the magnetic light-cutting members 6*a* from the plate 1*c,* the magnetic light-cutting members 6*a* are moved to each hole 5*b* of the holder 5*a* in response to gravity so that it is possible to obtain the light-transmitted state in accordance with portions that are pushed by the brush 14.

Accordingly, the brush 14 is touched on the surface of the plate 1*c* so as to draw characters or pictures by using a writing brush used as the writing means. A plurality of magnetic light-cutting members 6*a,* which are touched by the writing brush, are moved to the rear side so that the light can be transmitted through the tube 5*a* and it is possible to draw characters or pictures on the plate 1*c*. In FIG. 5, reference number 1*c* is the plate, 4*a* is the light-cutting member, 5*a* is the holder, 5*b* is the hole, and 6 is the magnet.

Figure 6:
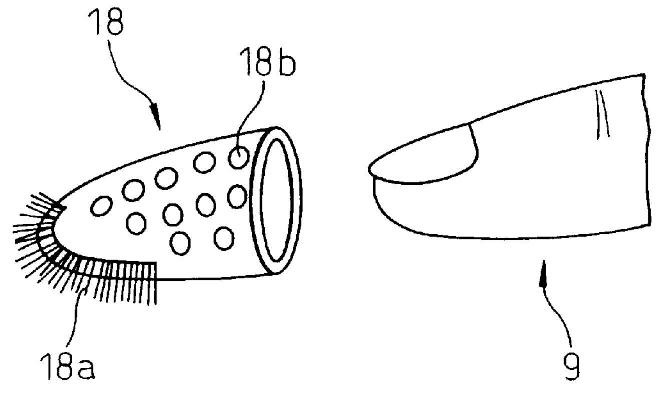
FIG. 6 is an explanatory view for explaining a finger-stall type brush used for drawing characters or pictures with high density on the board, in the light-drawing type display apparatus shown in FIGS. 4(A) and 4(B).

FIG. 6 shows one example of a finger-stall type brush as the writing means in order to realize high density light-drawing in the second embodiment shown in FIGS. 4(A) and 4(B). Since a size of each hole should be small in order to realize high density light drawing, it is very difficult to closely draw characters or pictures by using a conventional brush. According to the present invention, as shown in FIG. 6, it is possible to precisely move the magnetic light-cutting members 6*a* and to draw in detail complicated portions of characters or pictures by using the finger-stall type brush 18 having a brush portion 18*a* which is fine and closely structured. In the drawing, reference number 18*b* is an air hole.

When partially erasing characters or pictures drawn on the board, as shown in FIG. 4(B), the magnet 10 used as the erasing means is brought near to the plate portion 1*c.* That is, when bringing the magnet 10 near to the plate 1*c,* the magnetic light-cutting member 6*a* moves due to the attraction force of the magnet 10 within the holder 5*a,* and contacts with the magnet 6 in the rear of the plate 1*c* so that it is possible to close the hole and to obtain the light-cutting state. In this case, when fully erasing characters or pictures on the whole of the plate, the plate is inclined to the front side in order to move all the magnetic light-cutting members at once.

Further, the material of the plate 1*c* in this embodiment, is not limited so long as it has a light-cutting characteristic, and it is possible to use a resin. Further, for the material of the magnet 6, preferably, it is possible to use a magnetic material or a resin mixed with magnetic powder. Further, the material of the holder 5*a* is not limited so long as it has light transmittance. However, it is preferable to use a resin having light transmittance in view of the manufacturing process.

Further, it is possible to delete the magnet 6 in the rear of the plate by using the magnetic member, such as the iron plate, as the material of the plate 1*c,* and by using the ferrite magnet as the material of the magnetic light-cutting member 6*a*.

Figure 7A:
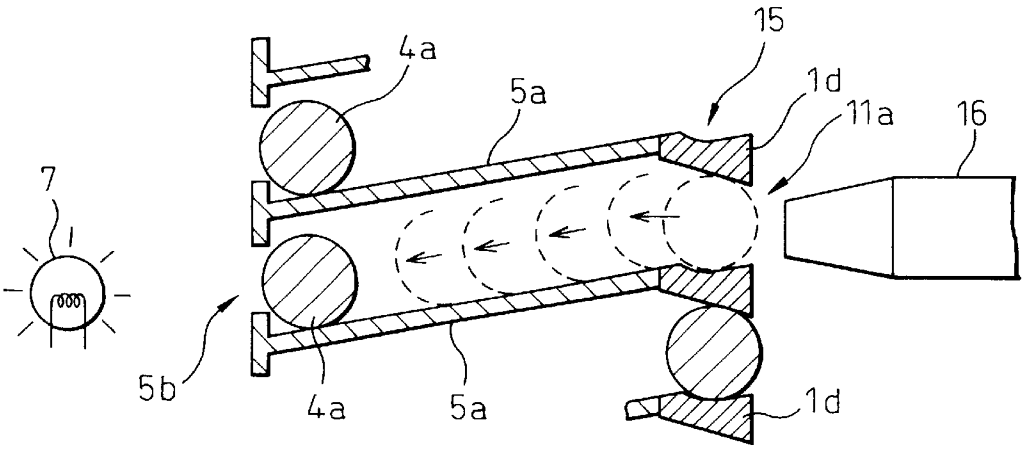
FIGS. 7(A) and 7(B) are explanatory views for explaining the operation of the moving mechanism of the light-cutting member in the light-drawing type display apparatus according to the third embodiment of the present invention.
Figure 7B:
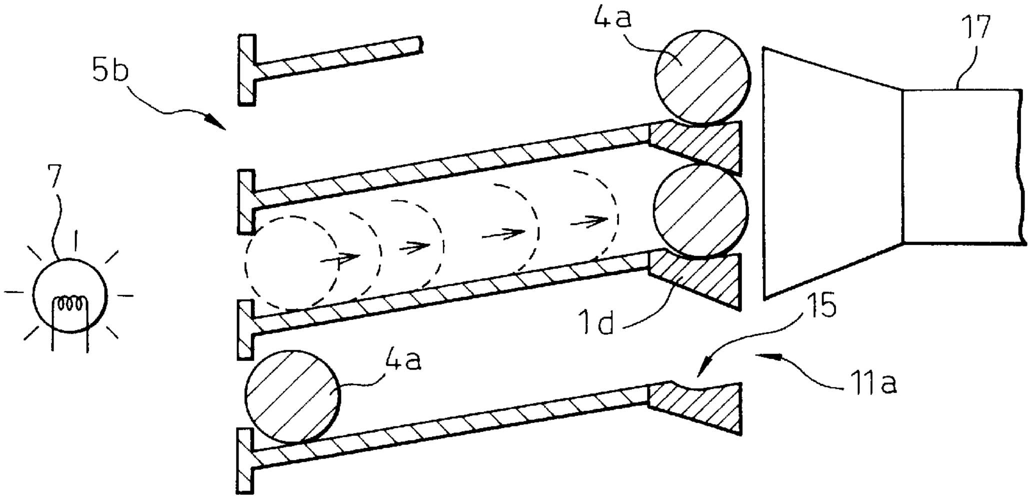

FIGS. 7(A) and 7(B) show the third embodiment of the present invention. Although this embodiment is similar to the second embodiment, but it is different from the second embodiment in that no magnetic force is utilized.

As shown in FIGS. 7(A) and 7(B), since no magnetic force is utilized, the dent portion 15 is provided on the plate 1*d* in order to prevent movement of the light-cutting member 4*a* caused by gravity.

In the third embodiment, the plate portion 1*d* is rotated to the front side before use of the display apparatus, the light-cutting member 4*a* is moved to the dent portion 15 in accordance with the gravity, and the plate portion 1*d* is moved so as to stand upright after the above processes. In this state, the light-cutting member 4*a* can be stopped on the dent portion 15 and is not moved therefrom.

When drawing characters and pictures on the light-drawing type display apparatus in the third embodiment as explained above, as shown in FIG. 7(A), a blowing tool 16 which blows air is brought near to the hole 11*a,* and characters or pictures are drawn by the blowing tool 16. As a result, the light-cutting member 4*a* which is provided on the dent portion 15 of the plate portion 1*d* is blown by the blowing tool 16 so that the light-cutting member 4*a* is moved to the hole 5*b* within the holder 5*a* which is obliquely mounted. Accordingly, it is possible to set the plate to the light-transmitting state. In this case, since the hole 5*b* is provided to the holder 5*a,* the air by the blowing tool 16 pushes the light-cutting member 4*a* and can pass through the hole 5*b*.

On the other hand, when fully erasing characters or pictures displayed on the plate, the whole of the plate 1*d* is rotated, and all light-cutting members 4*a* are again put onto the dent portion 15 of the plate portion 1*d* so that it is possible to erase characters or pictures on the whole of the plate. Further, as shown in FIG. 7(B), when partially erasing characters or pictures, a sucking tool 17, which is used as the erasing tool and sucks the air, is brought near to the hole 11*a*. As a result, it is possible to put the light-cutting member into the dent portion 15 of the plate portion 1*d* from the vicinity of the hole 5*b* of the holder 5*a* so that it is possible to partially set the plate to the light-cutting state.

Since a method of moving the light-cutting member 4*a* by using the sucking tool 17 is provided in the third embodiment, the light-transmitting material is required for the holder 5*a* as the useful material. However, it is possible to utilize a metal, a non-metal, a resin, etc., as other materials which can obtain the light-cutting state.

Further, if the magnetic member is used as the light-cutting member 4*a* in this embodiment, it is possible to operate this embodiment in accordance with the second embodiment. Accordingly, it is possible to overlap the second and third embodiments since the structures of these embodiments are similar to each other.

Figure 8:
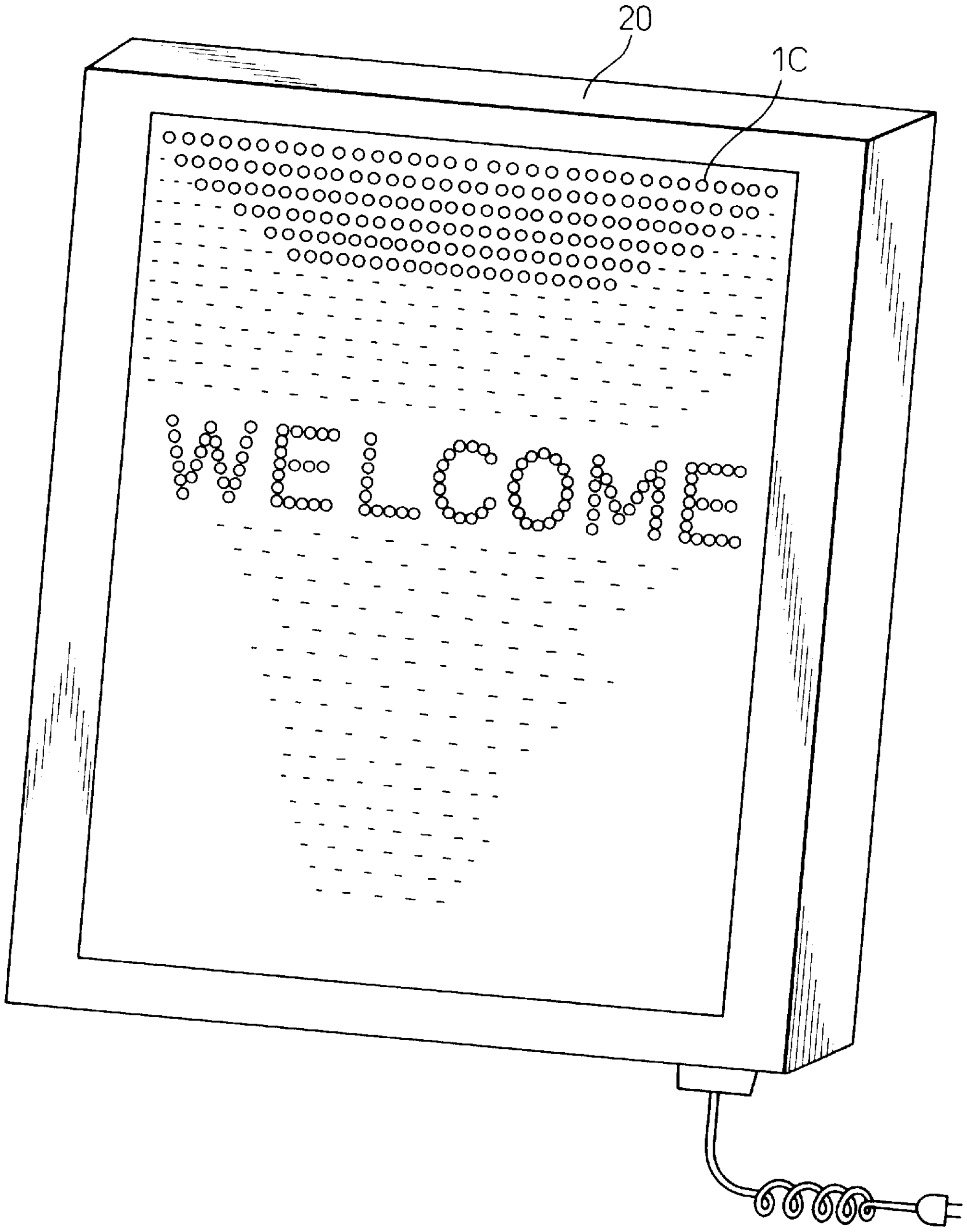
FIG. 8 is an outer view representing the whole of the light-drawing type display apparatus according to the present invention.

FIG. 8 is an outer view of the light-drawing type display apparatus according to the present invention. This shows the whole of the structure of the second embodiment shown in FIGS. 4(A) and 4(B). The plate 1*c* having a plurality of small holes corresponds to the plate 1*c* in FIGS. 4(A) and 4(B). The light source (preferably, fluorescent lamp) 7 shown in FIG. 4(A) and the holder 5*a* (preferably, of resin having light transmittance) are provided within the frame 20 in the order shown in FIG. 4.

Prior to using the light-drawing type display apparatus according to the present invention, since all magnetic light-cutting members 6*a* are arranged in the front side, the light from the light source 7 cannot be transmitted so that the whole of the board is black. Then, when the user draws the characters, for example, "W E L C O M E" on the board by using the brush 14 shown in FIG. 4(A) as the writing means, the magnetic light-cutting members 6*a* pushed by the brush 14 are removed from the surface, and the light from the rear is transmitted to the board so that it is possible to display the characters.

On the other hand, when the user wishes to fully erase the characters displayed on the plate, the board is inclined to the front side so as to obtain the light-cutting state. When the user wishes to partially erase the characters, the magnetic light-cutting members 6*a* are attracted to the surface of the board by utilizing the attraction force of the magnet 10 shown in FIG. 4(B) as the erasing means so that the light is cut off and the characters are partially erased.

Figure 9:
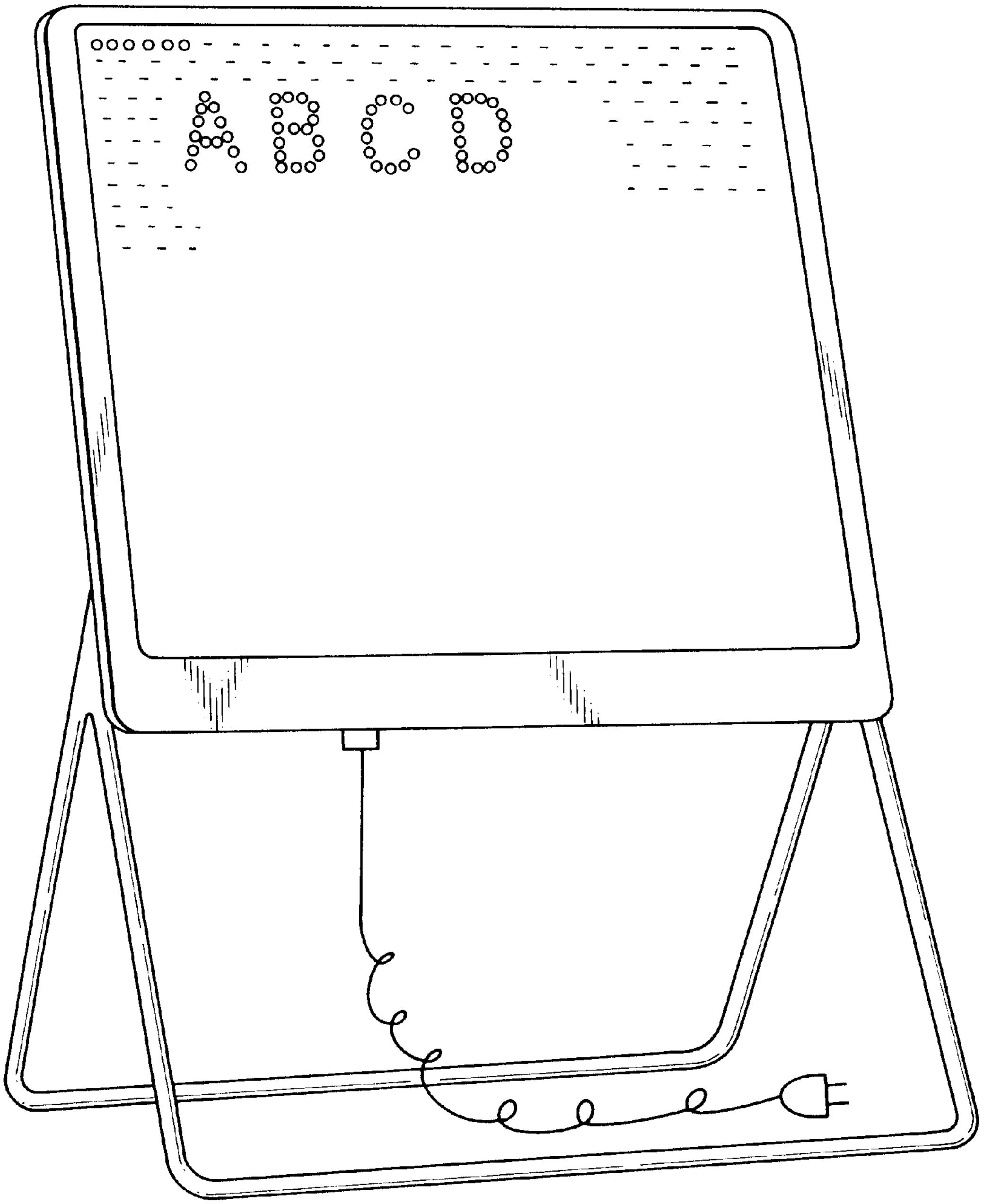
FIG. 9 is a board outer view when the light-drawing type display apparatus according to the present invention is applied to the board.

FIG. 9 is an outer view of the board according to the present invention. For example, it is possible to realize a board product used for the conference by applying the first embodiment shown in FIG. 1, the second embodiment shown in FIG. 4, and the third embodiment shown in FIGS. 7(A) and 7(B) to the board product.

Briefly the light-drawing type display apparatus completed by the present invention has the following effects.

(1) Although there are systems in which the contents previously input from an input means are displayed on the display apparatus formed of light emitting members, such as photodiodes, liquid crystal elements, etc., in the present invention, however, since it is possible to easily and freely write or erase characters or pictures on the board, the apparatus of the present invention is very convenient in actual use. Further, since the apparatus of the present invention has very a simple structure, it is possible to provide a low cost light-drawing type display apparatus.

(2) Since the apparatus of the present invention is formed as a light-drawing type, it is not influenced by the brightness in the room so that it is possible to display characters or pictures so as to be easily observed from any angle. That is, it is possible to solve a problem in which characters or pictures hard to see caused by light reflection from the surface of the board dependent on the observation angle. Accordingly, it is possible to utilize the present invention not only the board used for conference, but also an advertising board.

(3) Since a conventional chalk and quick-drying ink are not used in the present invention, it is possible to eliminate dust caused by the chalk, uncomfortable touch for the tip of the finger, etc. Further, it is possible to eliminate the smell from the quick-drying ink and the sanitary problems. Still further, as mentioned above, it is possible to easily write or erase characters or pictures on the board.

Capability of Utilization in Industry

As explained above, the light-drawing type display apparatus according to the present invention is very convenient in actual use compared to conventional liquid crystal display apparatuses, and is very advantageous for the cost because of simplified structure. Further, the present invention is easy in actual use and is without an uncomfortable touch compared to conventional chalk and quick-drying ink. The board of the light-drawing type display apparatus according to the present invention can be applied to, for example, a board used in a council room, a black board used in a schoolroom, a board used for advertisements, and building materials, for example, windows for admitting light from the outside of the house. Accordingly, the present invention has a very high capability of utilization in industry in a very wide range of applications.

What is claimed is:

1. A light-drawing type display apparatus comprising:

a plate having a front side and a rear side, and having a plurality of light-transmitting small holes;

a plurality of light-cutting members, each of which is provided to a different one of the plurality of small holes of the plate in order to open or close each of the small holes; wherein each of the plurality of light-cutting members is a spherical magnetic light-cutting member;

a light-transmitting holder which is inclined at a predetermined angle mounted at each small hole through the magnet provided to the rear side of the plate; and each spherical magnetic light-cutting member is arranged so as to move within the holder; and a light source provided to the rear side of the plate for irradiating the rear side of the plate;

wherein at least some of the plurality of light-cutting members are movable in response to a predetermined writing means based on a writing operation in a pattern by a user, so that at least some of the plurality of light-transmitting small holes are opened, and the light from the light source is transmitted to the front side, such that characters or pictures in the pattern are drawn on the plate;

wherein at least some of the plurality of light-cutting members are movable in response to a predetermined erasing means based on an erasing operation by the user, so that the plurality of light-transmitting small holes are closed, and the light from the light source is cut off, such that the characters or pictures in the pattern are erased from the plate wherein when an external force is applied to the spherical magnetic light-cutting members with a writing brush used as the writing means, the spherical magnetic light-cutting member is moved by the external force and gravity within the holder so as to transmit the light from the light source; and wherein when an erasing magnet used as the erasing means is brought near to the magnetic light-cutting member, the spherical magnetic light-cutting member is moved to the rear of the plate so that the light from the light source is cut off.

2. A light-drawing type display apparatus comprising:

a plate having a front side and a rear side, and having a plurality of light-transmitting small holes;

a plurality of light-cutting members, each of which is provided to a different one of the plurality of small holes of the plate in order to open or close each of the small holes; wherein each of the plurality of light-cutting members is a spherical magnetic light-cutting member which can move within a light-transmitting holder which is inclined at a predetermined angle and mounted to each small hole in the rear side of the plate, the holder having a dent portion at the end adjacent to the rear side of the plate capable of holding the spherical magnetic light-cutting member in place; and a light source provided to the rear side of the plate for irradiating the rear side of the plate;

wherein at least some of the plurality of light-cutting members are movable in response to a predetermined writing means based on a writing operation in a pattern by a user, so that at least some of the plurality of light-transmitting small holes are opened, and the light from the light source is transmitted to the front side, such that characters or pictures in the pattern are drawn on the plate;

wherein at least some of the plurality of light-cutting members are movable in response to a predetermined erasing means based on an erasing operation by the user, so that the plurality of light-transmitting small holes are closed, and the light from the light source is cut off, such that the characters or pictures in the pattern are erased from the plate wherein when a blowing force is applied to the spherical magnetic light-cutting members with a blowing tool used as the writing means, the spherical magnetic light-cutting member is moved by the blowing force and gravity away from the rear of the plate within the holder so as to transmit the light from the light source; and wherein when a sucking tool used as the erasing means is brought near to the magnetic light-cutting member, the spherical magnetic light-cutting member is moved toward the rear of the plate so that the light-cutting member comes to rest on the dent portion of the holder adjacent to the plate, and the light from the light source is cut off.

* * * * *